United States Patent [19]

Murakoshi et al.

[11] Patent Number: 5,019,907

[45] Date of Patent: May 28, 1991

[54] PULSE GENERATING CIRCUIT

[75] Inventors: Satoshi Murakoshi; Atsushi Sakurai, both of Atsugi, Japan

[73] Assignee: Kabushiki Kaisha Yamashita Denshi Sekkei, Atsugi, Japan

[21] Appl. No.: 446,145

[22] Filed: Dec. 5, 1989

[30] Foreign Application Priority Data

Dec. 20, 1988 [JP] Japan ................................ 63-322715

[51] Int. Cl.$^5$ .......................... H04N 5/04; H03L 7/00
[52] U.S. Cl. .................................... 358/158; 358/148; 331/20
[58] Field of Search ............... 358/148, 150, 153, 154, 358/158, 159, 155, 149; 331/20; 375/120

[56] References Cited

U.S. PATENT DOCUMENTS

| | | | |
|---|---|---|---|
| 4,245,251 | 1/1981 | Steckler et al. | 358/158 |
| 4,251,833 | 2/1981 | Fernsler et al. | 358/155 |
| 4,253,116 | 2/1981 | Rodgers, III | 358/149 |
| 4,780,759 | 10/1988 | Matsushima et al. | 375/120 |
| 4,809,068 | 2/1989 | Naga | 358/153 |
| 4,812,783 | 3/1989 | Honjo et al. | 358/158 |

Primary Examiner—John W. Shepperd
Assistant Examiner—Michael D. Parker
Attorney, Agent, or Firm—Fleit, Jacobson, Cohn, Price, Holman & Stern

[57] ABSTRACT

Horizontal synchronizing signals included in a video signal are inputted to a PLL circuit. A counter as a divider in the PLL circuit outputs signals which are synchronized with the horizontal synchronizing signals. A gate pulse generator counts the output pulses of counter and produces a control signal for controlling a phase comparator as one of elements of the PLL circuit. The operation of phase comparator is stopped in vertical intervals in accordance with the control signal so that the phase comparator is not affected by signals which are included in the video signal and are not synchronized with the horizontal synchronizing signals. Thus, the PLL circuit produces pulses which are synchronized with the horizontal synchronizing signals in a wide frequency range.

4 Claims, 2 Drawing Sheets

PULSE GENERATING CIRCUIT

BACKGROUND OF THE INVENTION

The invention relates to a pulse generating circuit for generating pulses in synchronism with horizontal synchronizing signals included in a video signal in a computer graphics (CG) system or computer-aided design (CAD) system.

A video signal in a CG system or CAD system has a resolution higher than that in an usual NTSC or PAL television system. Therefore, a high definition image can be obtained by printing an image in accordance with the video signal on a sheet of paper.

In order to print the image in accordance with such a video signal on a sheet of paper, the video signal is needed to be memorized in a memory. And, for writing on and reading from the memory the video signal, it is necessary to obtain pulses which are synchronized with horizontal synchronizing signals included in the video signal and have a frequency higher than the horizontal synchronizing signals.

A PLL circuit is employed to produce the pulses.

However, there exist no horizontal synchronizing signals in a vertical interval of the video signal in CG system or CAD system. Even if there exist signals in the vertical interval, the signals are not synchronized with the horizontal synchronizing signals. Therefore, the operation of PLL circuit is disturbed in the vertical interval and it is difficult to produce stably pulses in synchronism with the horizontal synchronizing signals.

SUMMARY OF THE INVENTION

It is an object of the invention to eliminate the disadvatages described above.

Another object of the invention is to provide a pulse generating circuit for producing stably pulses in synchronism with the horizontal synchronizing signals in a wide frequency range.

According to the invention, there is provided a pulse generating circuit comprising a first generating circuit for generating signals in synchronism with horizontal synchronizing signals included in an inputted video signal, a second generating circuit for generating signals in synchronism with vertical synchronizing signals included in the inputted video signal, a PLL circuit comprising a phase comparator to one of the terminals of which the output of first generating circuit is inputted, a low-pass filter for smoothing the output of phase comparator, a voltage controlled oscillator for generating pulses in accordance with the output of low-pass filter, and a first counter for dividing the output of voltage controlled oscillator and outputting it to the phase comparator, and a third generating circuit for generating a control signal for controlling the operation of phase comparator in compliance with a counted value of the output of the first counter or first generating circuit.

Accordingly, in spite of a state in the vertical interval of video signal, it is possible to produce stably the pulses synchronizing with the horizontal synchronizing signals in a wide frequency range.

DETAILED DESCRIPTION OF THE PREFERRED EMBODIMENTS

Figure 1:
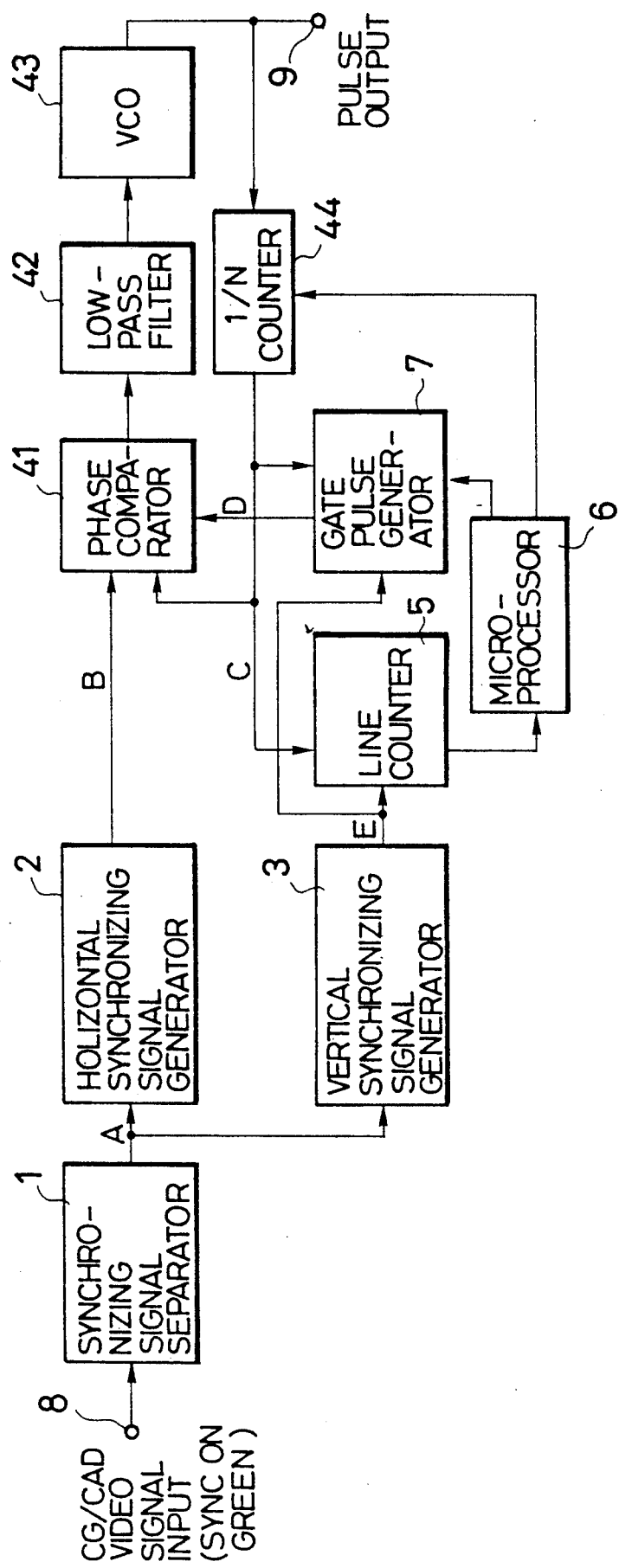
FIG. 1 is a block diagram of a pulse generating circuit according to the invention.

FIG. 1 is a block diagram of a pulse generating circuit according to the invention. In the figure, 1 is a synchronizing signal separator for separating synchronizing signals from a video signal (a green signal for instance) inputted through terminal 8 from a CG system, CAD system, and so forth. The output of synchronizing signal separator 1 is inputted to horizontal synchronizing signal generator 2 and vertical synchronizing signal generator 3. The output of horizontal synchronizing signal generator 2 is inputted to one of input terminals of phase comparator 41. PLL circuit 4 comprises phase comparator 41, low-pass filter 42 operating as a direct current amplifier, voltage controlled oscillator (VCO) 43, and counter 44. The output of counter 44 is inputted to another input terminal of phase comparator 41 and to line counter 5. The output of line counter 5 is inputted to microprocessor (CPU) 6 as an operating circuit and the output of microprocessor 6 is inputted to gate pulse generator 7.

Figure 2:
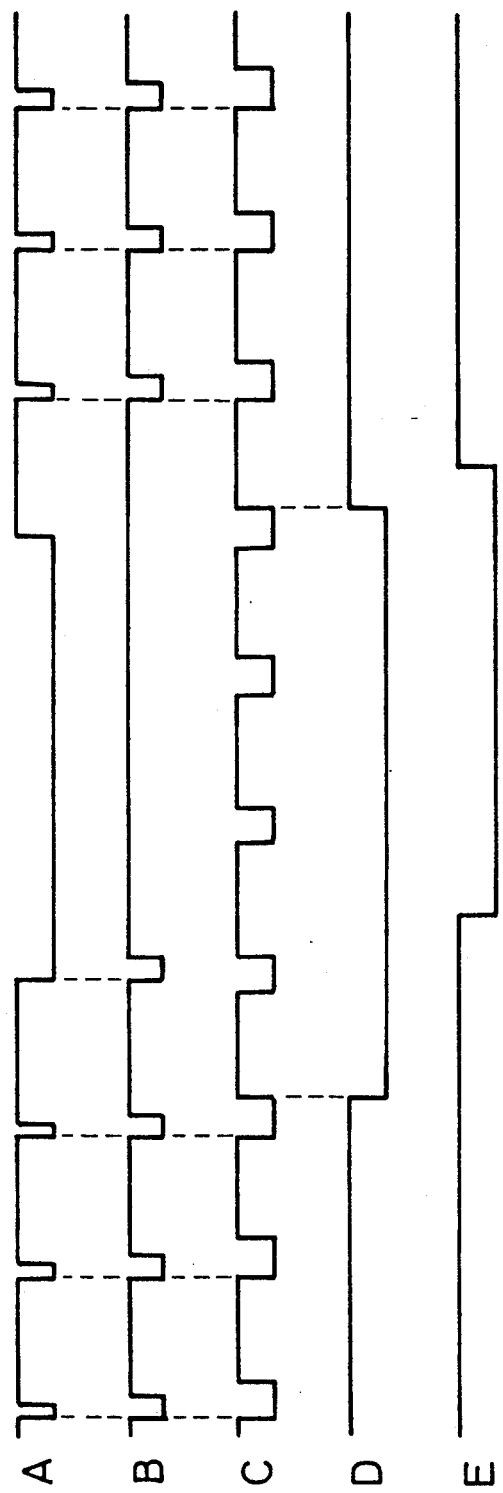
FIG. 2 is a timing chart in the pulse generating circuit shown in FIG. 1.

The operation will be described below with reference to FIG. 2. Synchronizing signal separator 1 separates synchronizing signals (FIG. 2A) from the video signal inputted through terminal 8. Horizontal synchronizing signal generator 2 generates horizontal synchronizing pulses (FIG. 2B) in synchronism with the falling edges of separated synchronizing signals. The horizontal synchronizing pulses are inputted to one of input terminals of phase comparator 41, to another terminal of which the output of counter 44 as a divider is inputted. Phase comparator 41 detects the phase deferences between the both inputs and produces error signals according to the phase deferences. The error signals are smoothed by low-pass filter 42 and inputted to voltage controlled oscillator 43, which in turn produces pulses having a frequency and phase according to the error signal. The pulses produced by voltage controlled oscillator 43 are inputted to counter 44 and divided by a rate of 1/N. The signals after division (FIG. 2C) are synchronized with the inputted horizontal synchronizing signals and have the same frequency with them. Therefore, voltage controlled oscillator 43 in PLL circuit 4 produces the pulses which are synchronized with the horizontal synchronizing signals in the inputted video signal and have N times frequency thereof. The pulses are outputted through terminal 9 to a specific circuit (for example a memory driver).

The output (FIG. 2C) of counter 44 (or the output of horizontal synchronizing signal generator (2) is inputted to line counter 5 and counted by it.

Vertical synchronizing signal generator 3 provides line counter 5 with signals (FIG. 2E) which are generated by delaying a little the vertical synchronizing signals included in the synchronizing signals (FIG. 2A) separated by and inputted from synchronizing signal separator 1. Line counter 5 repeats such an operation that it resets the counted values thereof at the timing of for instance the rising edges of signals (FIG. 2E) inputted from vertical synchronizing signal generator 3 and starts counting pulses outputted from counter 44 again. Namely, line counter 5 counts the number of horizontal synchronizing signals (horizontal scanning lines) in one field.

Many kinds of data is inputted to microprocessor 6 through line counter 5. In these data included are the vertical synchronizing signals (FIG. 2E) outputted from vertical synchronizing signal generator 3 and signals (FIG. 2C) outputted from counter 44 as well as the counted values of line counter 5. Microprocessor 6 operates and detects from these data the number of horizontal synchronizing signals in one field in the inputted video signal, the lengths of vertical intervals and so on. The dividing ratio 1/N in counter 44 is set in a specific value in compliance with the operation results of microprocessor 6.

Gate pulse generator 7 including a counter repeats such an operation that it clears the counting values at the timing of rising edges of output (FIG. 2E) of vertical synchronizing signal generator 3 and counts the output (FIG. 2C) of counter 44. When the counted value reaches a specific value equal to that inputted from microprocessor 6, gate pulse generator 7 outputs gate pulse (control signal)(FIG. 2D) at the timing synchronizing with the rising edges of output of counter 44, during a period until a specific number (it is four in the embodiment and is operated automatically from the input data in microprocessor 6) of pulses outputted from counter 44 is further counted. The width of gate pulse is set so that the vertical synchronizing signal (and signals which are inadequate for operation of PLL circuit 4) generates in the gate pulse. Phase comparator 41 stops its operation during a time when the gate pulse is inputted and reduces its output level gradually so that the output level at the time of just before (or after) generation of gate pulse comes to be a specific level at the time of termination of gate pulse, the specific level corresponding to the output level at the time when there are no phase errors. Accordingly, even if the signals which are not synchronized with the horizontal synchronizing signals are inserted in the vertical interval in the video signal inputted from terminal 8, the output of phase comparator 41 is not affected by these signals and PLL circuit 4 can continue to oscillate stably in a very wide frequency range.

In the above embodiment, a counter is included in gate pulse generator 7, however, the counter can be eliminated by making line counter 5 or microprocessor 6 count the pulses outputted from counter 44 or horizontal synchronizing signal generator 2.

What is claimed is:

1. A pulse generating circuit comprising:
    a first generating circuit for generating signals in synchronism with horizontal synchronizing signals included in an inputted video signal;
    a second generating circuit for generating signals in synchronism with vertical synchronizing signals included in the inputted video signal;
    a PLL circuit comprising:
        a phase comparator have first and second input terminals, the first of which being connected to the output of the first generating circuit;
        a low-pass filter for smoothing the output of the phase comparator;
        a voltage controlled oscillator for generating pulses in accordance with the output of the low-pass filter; and
        a first counter for dividing the output of the voltage controlled oscillator and generating output signals which are applied to the second input terminal of the phase comparator;
    a third generating circuit for generating a control signal for controlling the phase comparator so that the operation of the phase comparator is inhibited at the time of a vertical interval;
    a second counter for counting the output of the first counter in one field; and
    an operating circuit for receiving the second counter output and producing as a output a signal for controlling the third generating circuit.

2. A pulse generating circuit comprising:
    a first generating circuit for generating signals in synchronism with horizontal synchronizing signals included in an inputted video signal;
    a second generating circuit for generating signals in synchronism with vertical synchronizing signals included in the inputted video signal;
    a PLL circuit comprising:
        a phase comparator having first and second input terminals, the first input terminal being connected to the output of the first generating circuit;
        a low-pass filter for smoothing the output of the phase comparator;
        a voltage controlled oscillator for generating pulses in accordance with the output of the low-pass filter; and
        a first counter for dividing the output of voltage controlled oscillator and generating output signals which are applied to the second input terminal of the phase comparator; and
    a third generating circuit for generating a control signal for controlling the phase comparator so that operation of the phase comparator is inhibited at the time of a vertical interval for gradually reducing the level of the output of the phase comparator in response to the control signal and to limit the output of the phase comparator to a specific level when the control signal terminates.

3. A pulse generating circuit according to claim 1, wherein the operating circuit controls the dividing rate of the first counter.

4. A pulse generating circuit according to claim 2, wherein the specific level corresponds to the output level of the phase comparator at the time when there are no phase errors.

* * * * *